United States Patent
Orihashi et al.

(10) Patent No.: US 8,430,198 B2
(45) Date of Patent: Apr. 30, 2013

(54) MUFFLER MOUNTING STRUCTURE OF VEHICLE AND STRADDLE-TYPE FOUR-WHEELED VEHICLE PROVIDED WITH THE SAME

(75) Inventors: Yoshihiko Orihashi, Akashi (JP); Masashi Fukuuchi, Kobe (JP); Atsushi Eto, Kakogawa (JP); Ryosuke Masuike, Akashi (JP); Tamotsu Hatada, Awaji (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 238 days.

(21) Appl. No.: 12/972,855

(22) Filed: Dec. 20, 2010

(65) Prior Publication Data

US 2012/0152643 A1 Jun. 21, 2012

(51) Int. Cl.
*B60K 13/04* (2006.01)
*F01N 13/18* (2010.01)
*F01N 13/00* (2010.01)

(52) U.S. Cl.
USPC .......... 180/309; 180/296; 180/89.2; 181/228; 181/243; 248/65

(58) Field of Classification Search .................. 180/309, 180/296, 89.2; 181/227, 228, 243; 293/113; 60/272; 248/50, 58, 65
See application file for complete search history.

(56) References Cited

U.S. PATENT DOCUMENTS

| | | | | |
|---|---|---|---|---|
| 2,709,564 A * | 5/1955 | Stenner | .......................... | 248/232 |
| 6,536,548 B2 * | 3/2003 | Steenackers et al. | ......... | 180/89.2 |
| 6,591,935 B1 * | 7/2003 | Petley | ............................ | 180/309 |
| 6,719,084 B2 | 4/2004 | Kuji et al. | | |
| 6,752,239 B2 * | 6/2004 | Misaki | ........................... | 181/240 |
| 7,458,440 B2 * | 12/2008 | Uegane | ......................... | 181/228 |
| 7,644,791 B2 * | 1/2010 | Davis et al. | .................. | 180/68.1 |
| 7,678,168 B2 * | 3/2010 | Connelly et al. | .............. | 55/385.3 |
| 7,913,796 B2 * | 3/2011 | Nishino | ......................... | 180/309 |
| 7,946,380 B2 * | 5/2011 | Yamamoto et al. | ........... | 181/227 |
| 8,181,733 B2 * | 5/2012 | Locati et al. | ................... | 180/309 |
| 2008/0116004 A1 * | 5/2008 | Muto | ............................. | 181/228 |
| 2009/0120716 A1 * | 5/2009 | Yamamoto et al. | ........... | 181/205 |

* cited by examiner

*Primary Examiner* — J. Allen Shriver, III
*Assistant Examiner* — Andrew Khouzam
(74) *Attorney, Agent, or Firm* — Wenderoth, Lind & Ponack, L.L.P.

(57) ABSTRACT

A muffler mounting structure of a vehicle, particularly a straddle-type four-wheeled vehicle. The muffler mounting structure is provided with a muffler, at least one muffler mounting portion provided in a body frame and having a mounting hole, and at least one mounted bracket provided in an upper part of the muffler and disposed on an upper surface of the muffler mounting portion. The mounted bracket having a fixing member insertion hole passing in the up and down direction, and at least one fixing member inserted into the fixing member insertion hole from the upper side and fixed to the mounting hole.

13 Claims, 7 Drawing Sheets

MUFFLER MOUNTING STRUCTURE OF VEHICLE AND STRADDLE-TYPE FOUR-WHEELED VEHICLE PROVIDED WITH THE SAME

BACKGROUND OF THE INVENTION

1. Field of the Invention

The present invention relates to a muffler mounting structure of a vehicle, and particularly relates to a muffler mounting structure suitable for a straddle-type four-wheeled vehicle.

2. Description of the Related Art

FIG. 9 shows a body frame, an engine, an exhaust system, and the like of a conventional saddle-type four-wheeled vehicle described in U.S. Pat. No. 6,719,084. In FIG. 9, the body frame is provided with a box-shape main frame portion 201, and a rear frame portion 202 protruding rearward from the main frame portion 201. An engine 204 is for example a V-engine having a front cylinder 204a tilted forward and a rear cylinder 204b tilted rearward, and is arranged in the main frame portion 201. A muffler 205 is mounted on one side of the rear frame portion 202 in the lateral direction. A front-cylinder exhaust pipe assembly 210 connected to the front cylinder 204a of the engine 204, and a rear-cylinder exhaust pipe assembly 211 connected to the rear cylinder 204b are respectively extended rearward and connected to the muffler 205.

A muffler mounting plate 215 is fixed on the one side of the rear frame portion 202 by welding, and this muffler mounting plate 215 has a substantially vertical mounting surface, and a female screw portion (not shown). Meanwhile, a pair of mounted brackets 216, 216 protruding upward is formed in an upper end of the muffler 205. These mounted brackets 216, 216 respectively have mounted surfaces substantially parallel to the muffler mounting plate 215, and bolt insertion holes (not shown) passing through the mounted brackets 216, 216 in the lateral direction. The mounted brackets 216, 216 are fixed to the muffler mounting plate 215 by a pair of bolts 217, 217 inserted from the side (the left side).

As shown in FIG. 9, in a structure in which the vertical mounted surfaces of the mounted brackets 216, 216 of the muffler 205 are matched with the vertical mounting surface of the muffler mounting plate 215 of the rear frame portion 202, and fixed by the bolts 217, 217 from the side (the left side), the muffler 205 is easily oscillated in the front and rear direction during travel due to vibration of the vehicle and the like. Thus, moment is applied onto the bolts 217, 217 around axes of the bolts, so that the bolts 217, 217 are easily loosened. Therefore, there is a need for providing prevention of loosening and the like.

In a case where the bolts 217, 217 and the like are operated from the side of the vehicle, a rear fender, rear wheels, and the like can sometimes interfere with and complicate a mounting operation.

SUMMARY OF THE INVENTION

The present invention is achieved in consideration of the above problems, and an object thereof is to provide a muffler mounting structure of a vehicle capable of easily performing a mounting task of a muffler to a body frame from the upper side, and even when vibration in the front and rear direction is applied to the muffler during travel, the mounting structure is capable of preventing loosening of fixing means such as bolts.

In order to solve the problems, a muffler mounting structure of a vehicle according to the present invention includes a muffler, at least one muffler mounting portion provided in a body frame, the muffler mounting portion having a mounting hole, at least one mounted bracket provided in an upper part of the muffler and disposed on an upper surface of the muffler mounting portion. The mounted bracket having a fixing member insertion hole passing in the up and down direction, and at least one fixing member inserted into the fixing member insertion hole of the mounted bracket from the upper side and fixed to the mounting hole so as to fix the mounted bracket to the muffler mounting portion.

According to the above configuration, in the course of mounting the muffler, both a task of disposing the mounted bracket of the muffler at a predetermined position of the muffler mounting portion, and a task of fastening by a bolt can be easily performed from the upper side.

Moreover, even when the vibration in the front and rear direction is applied to the muffler during travel, force is not imposed on the mounted bracket in the direction in which the fixing member is loosened around an axis of the fixing member such as the bolt. Thereby, the loosening of the fixing member such as the bolt can be prevented.

In the present invention, the above muffler mounting structure is preferably provided with the following configurations.

(a) The muffler mounting portion has a stopper surface to be abutted with part of the mounted bracket for preventing the mounted bracket from rotating around an axis of the fixing member.

According to the above configuration (a), even when large vibration is applied to the muffler, part of the mounted bracket is abutted with the stopper surface, so that the loosening of the bolt can be surely prevented.

(b) The mounted bracket is fixed to the muffler through a damper mechanism. The damper mechanism includes a tubular boss formed in the mounted bracket, a tubular damper to be fitted into the tubular boss, and a rod fixed to the muffler and press-fitted into the damper in the front and rear direction.

According to the above configuration (b), even when the vibration in the front and rear direction is applied to the muffler, the vibration can be absorbed by the damper, so that transmission of the vibration to the mounted bracket can be prevented. The rod is press-fitted into the damper in the front and rear direction. Thus, even when the force is imposed onto the muffler in the front and rear direction, the force does not act as force for shearing the damper but durability of the damper is maintained.

(c) The muffler mounting structure provided with the damper of the above configuration (b) further includes: the front and rear muffler mounting portions arranged so as to be spaced from each other in the front and rear direction; the front and rear mounted brackets arranged so as to be spaced from each other in the front and rear direction; and the one rod protruding on the front and rear sides. A front end of the rod is press-fitted into the damper of the front mounted bracket, and a rear end of the rod is press-fitted into the damper of the rear mounted bracket.

According to the above configuration (d), one rod is utilized and supported on a pair of the front and rear mounted brackets through the dampers. Thus, by supporting the muffler at two points, the strength of supporting the muffler is improved, and at the same time, the number of parts can be reduced.

(e) In the muffler mounting structure provided with the above configuration (d), a front end of the front boss has a front inward flange locking the front damper from the front side, a rear end of the rear boss has a rear inward flange locking the rear damper from the rear side, and the rod has a front collar portion locking a rear end of the front damper from the rear side, and a rear collar portion locking a front end of the rear damper from the front side.

According to the above configuration (e), positions of the dampers in the front and rear direction can be regulated with a simple structure, so that the strength of muffler mounting structure is improved.

(f) The mounting hole is a female screw hole, and the fixing member is a bolt.

Further, the present invention provides a straddle-type four-wheeled vehicle provided with the muffler mounting structure of any one of the configurations (a) to (f).

BRIEF DESCRIPTION OF THE DRAWINGS

The object, characteristics, and advantages of the present invention will be clarified by the following description in conjunction with the attached drawings.

DETAILED DESCRIPTION OF THE INVENTION

Figure 1:
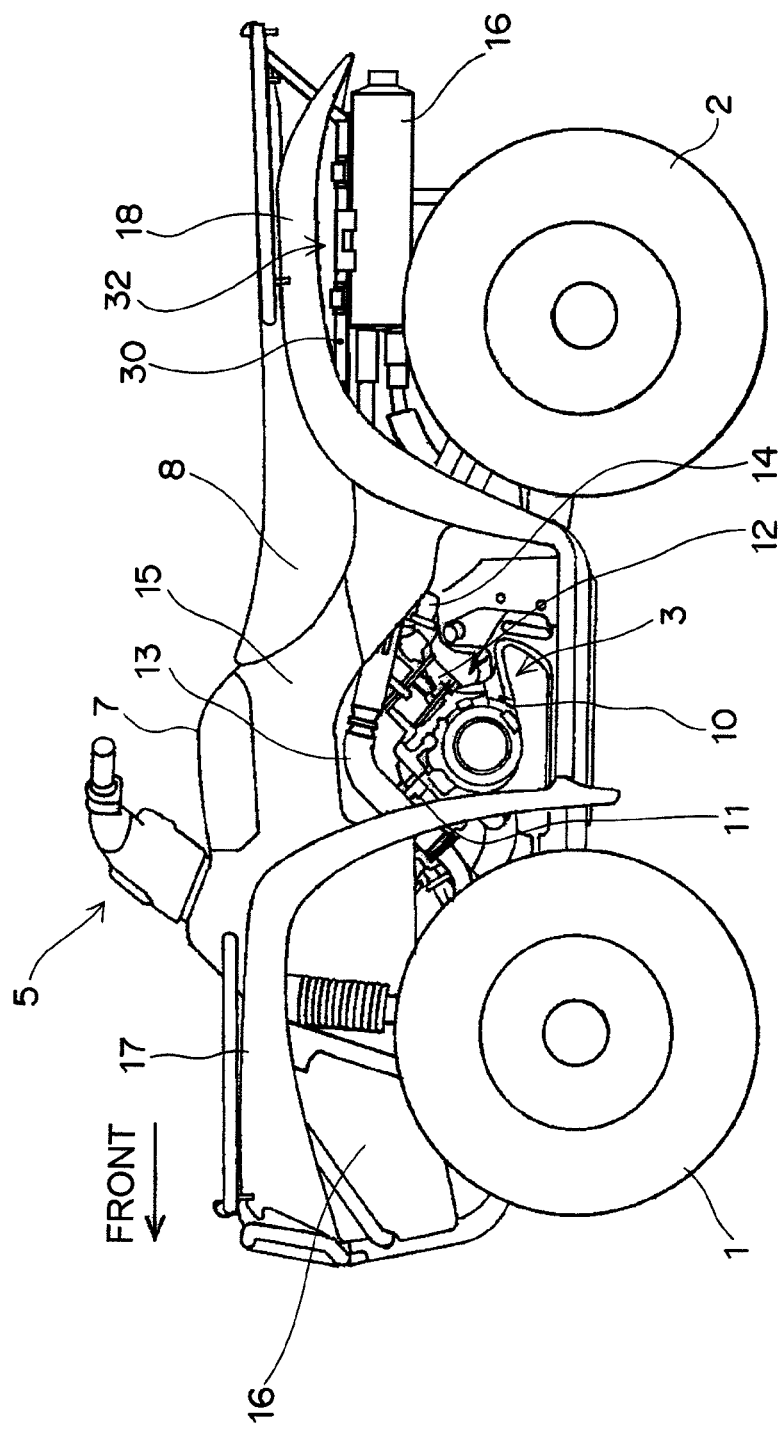
FIG. 1 is a left side view of a straddle-type four-wheeled vehicle according to one embodiment of the present invention.

FIGS. 1 to 8 show a straddle-type all terrain four-wheeled vehicle according to one embodiment of the present invention, and an exhaust system. The embodiment will be described based on the drawings. It should be noted that for convenience of description, the left and right sides seen from a passenger on the vehicle (that is, the "left and right sides" seen from the rear side of the vehicle) will be described as the "left and right sides" of the vehicle. The "left and right sides" seen from the rear side are also described in the drawings.

1. Structure of the Vehicle

FIG. 1 is a left side view of the straddle-type all terrain four-wheeled vehicle. In FIG. 1, a pair of front wheels 1 is provided in a front part of the vehicle, a pair of rear wheels 2 is provided in a rear part of the vehicle, and a steering wheel 5, an air intake box 7, and a straddle-type seat 8 are provided in order from the front side in an upper part of the vehicle. A two-cylinder V-engine 3 is installed between the front wheels 1 and the rear wheels 2. The two-cylinder V-engine 3 is provided with a front cylinder 11 tilted forward and a rear cylinder 12 tilted rearward on the upper side of a crankcase 10.

An exhaust pipe assembly 13 for front cylinder 11 and an exhaust pipe assembly 14 for rear cylinder 12 are respectively connected to a front wall of the front cylinder 11 and a rear wall of the rear cylinder 12. The exhaust pipe assemblies 13, 14 extend rearward.

A single muffler 16 is arranged on one side (such as the left side) of a rear part of the vehicle in the lateral direction. Rear ends of both of the exhaust pipe assemblies 13, 14 are connected to a front end of the muffler 16.

The vehicle is provided with, as cover members, a body cover (a body cowl) 15 covering the left and right sides of an upper part of a body frame, a front cover (a front cowl) 16 covering the front part of the vehicle, a front fender 17 covering the upper and rear sides of the front wheels 1, and a rear fender 18 covering the front and upper sides of the rear wheels 2.

Figure 2:
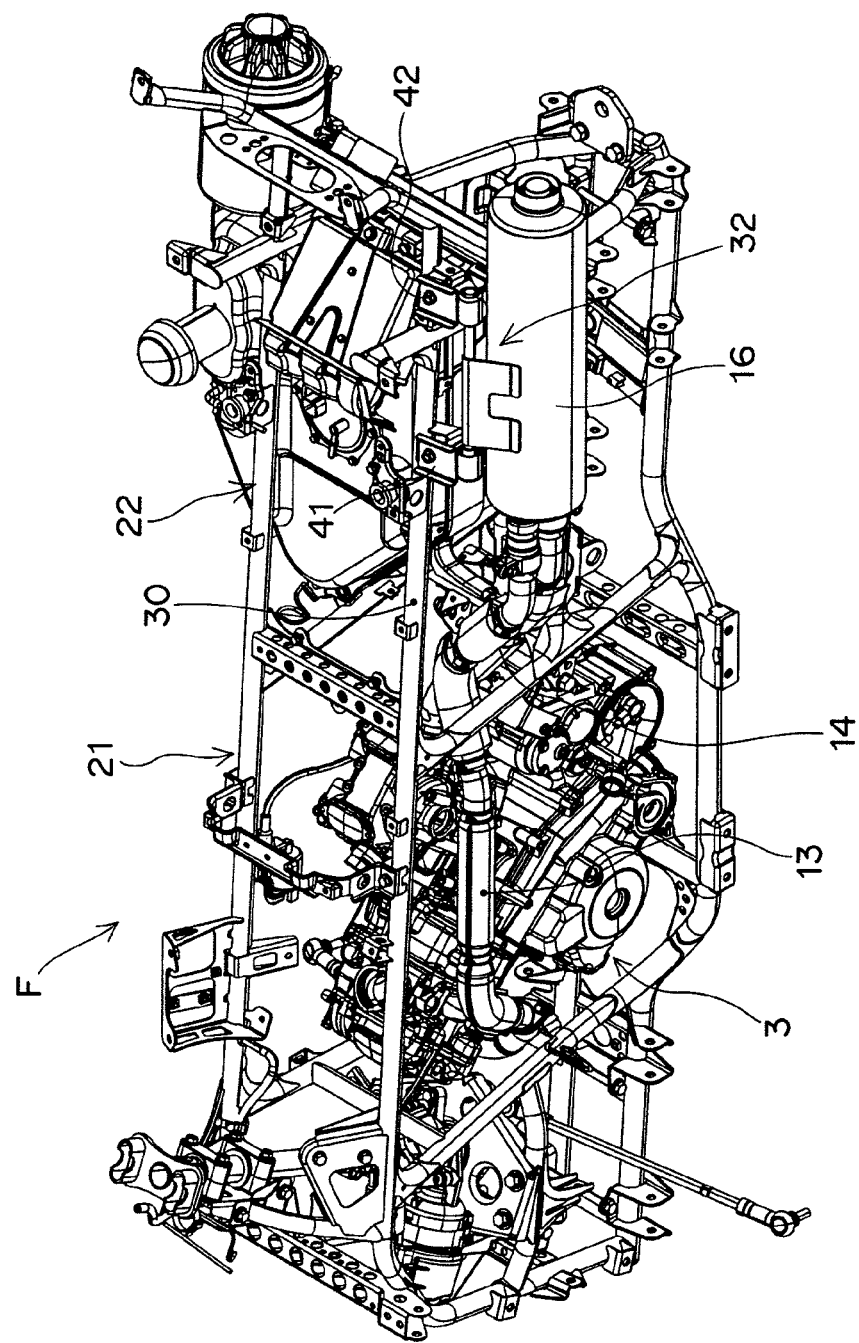
FIG. 2 is a perspective view of a body frame, an engine, and an exhaust system of the straddle-type four-wheeled vehicle shown in FIG. 1.

FIG. 2 is a perspective view of a body frame F, the engine 3, and the exhaust system. The body frame F integrally has a box-shape main frame portion 21 in a front part thereof, and a box-shape rear frame portion 22 protruding rearward from the main frame portion 21. The engine 3 is installed in the main frame portion 21, and the muffler 16 is mounted to an upper pipe 30 on the left side of the rear frame portion 22 through a muffler mounting device 32.

2. Mounting Structure of the Muffler

Figure 3:
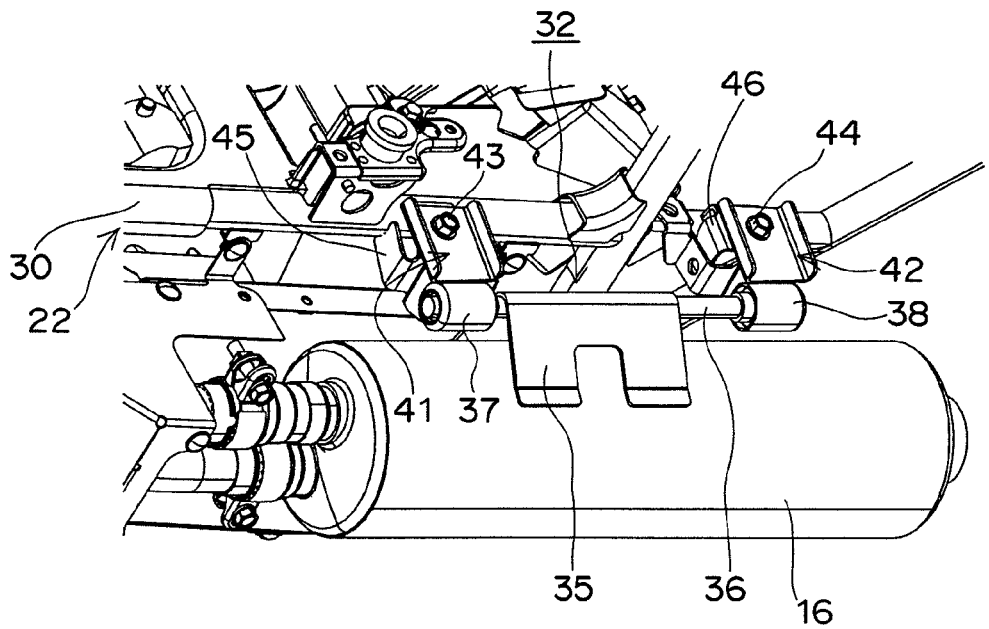
FIG. 3 is an enlarged perspective view of a muffler of the straddle-type four-wheeled vehicle shown in FIG. 1.
Figure 4:
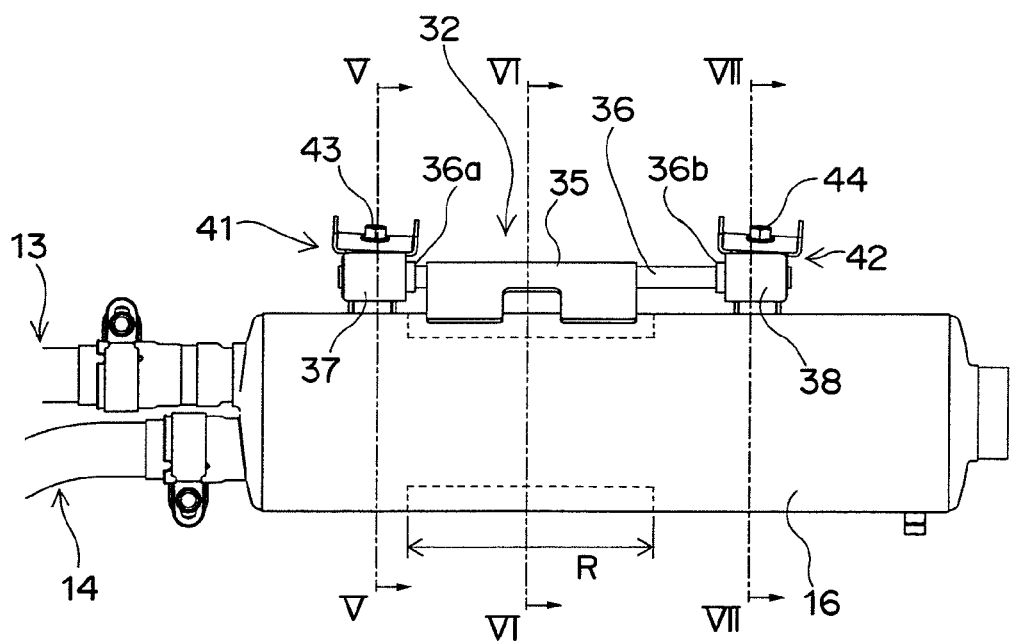
FIG. 4 is an enlarged left side view of the muffler of the straddle-type four-wheeled vehicle shown in FIG. 1.
Figure 5:
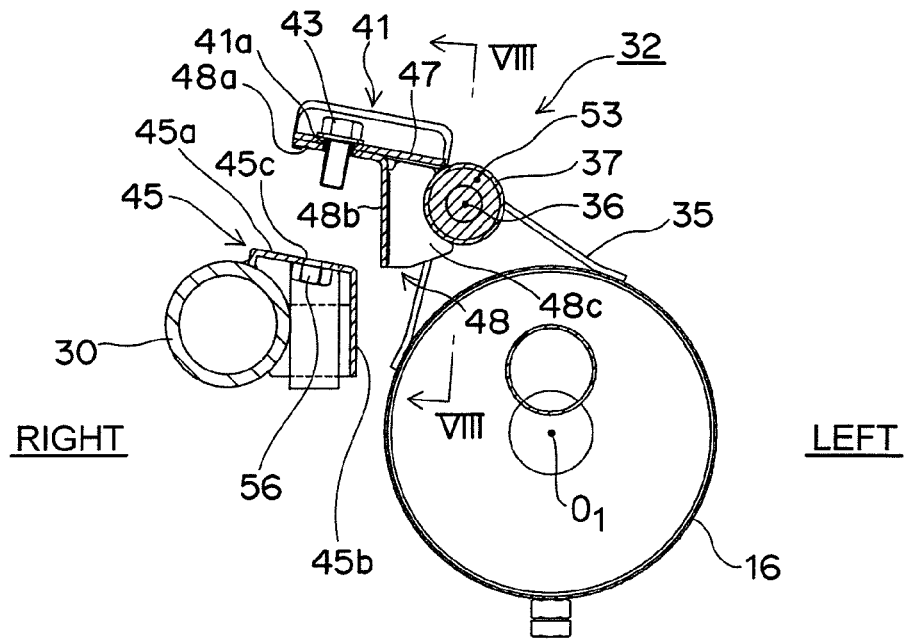
FIG. 5 is a sectional view taken along line V-V of the muffler in FIG. 4.
Figure 6:
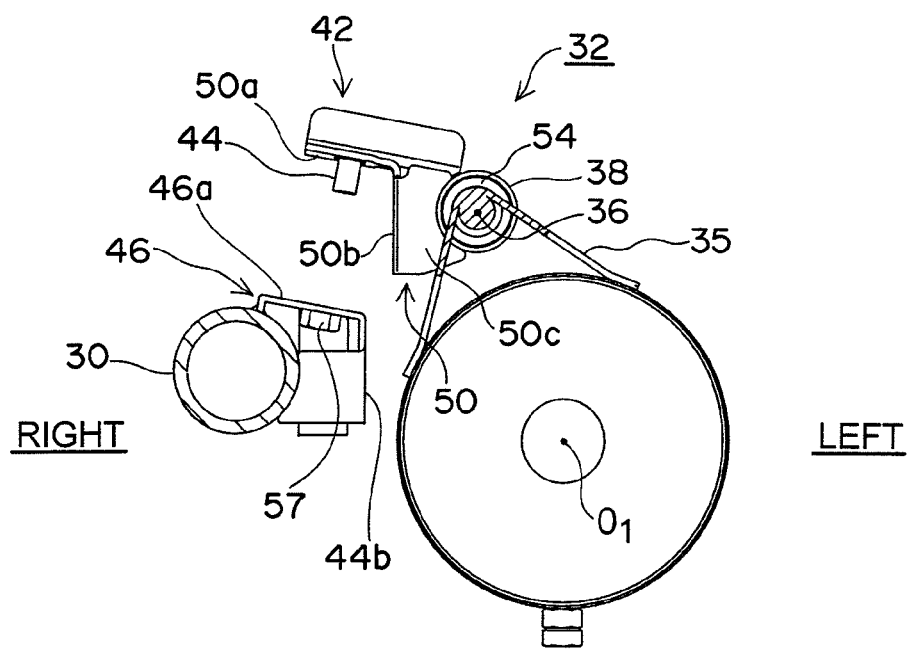
FIG. 6 is a sectional view taken along line VI-VI of the muffler in FIG. 4.
Figure 7:
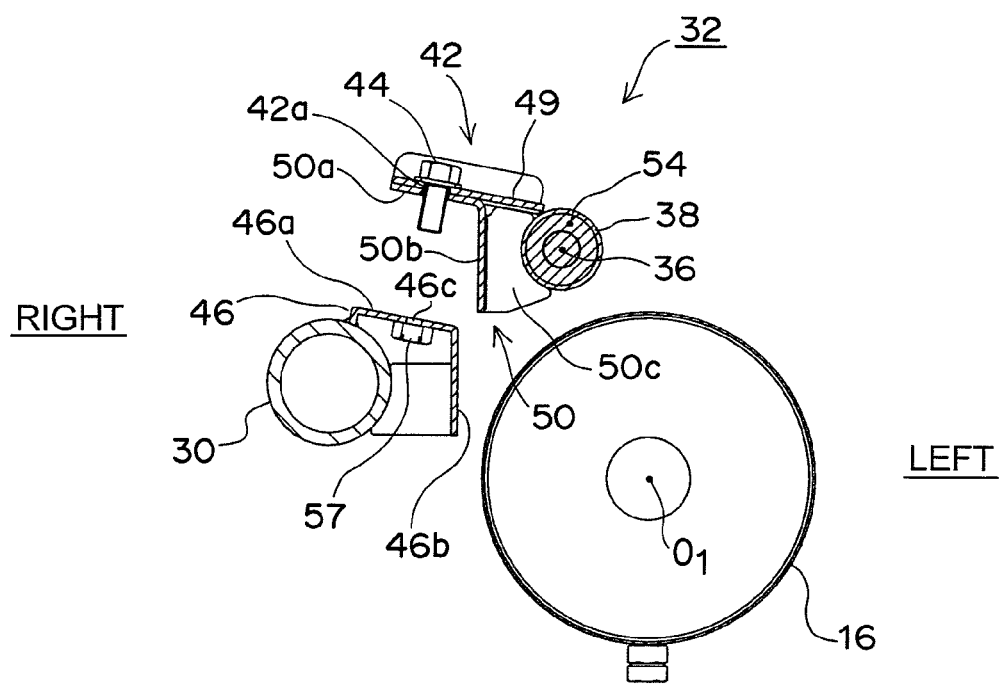
FIG. 7 is a sectional view taken along line VII-VII of the muffler in FIG. 4.
Figure 8:
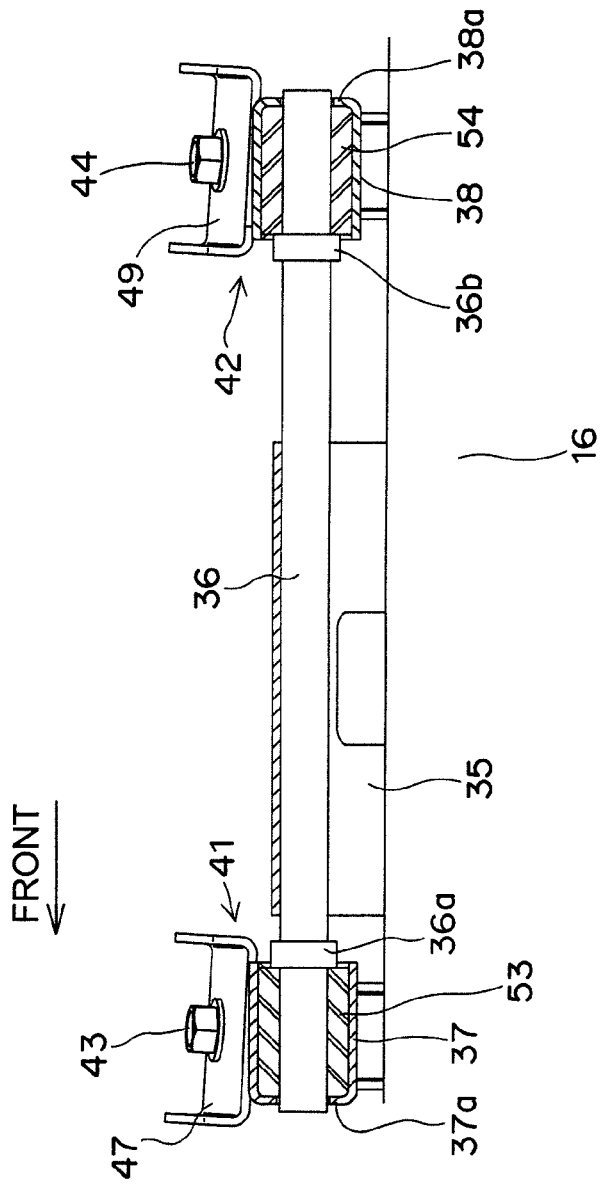
FIG. 8 is a sectional view taken along line VIII-VIII of the muffler in FIG. 5.
Figure 9:
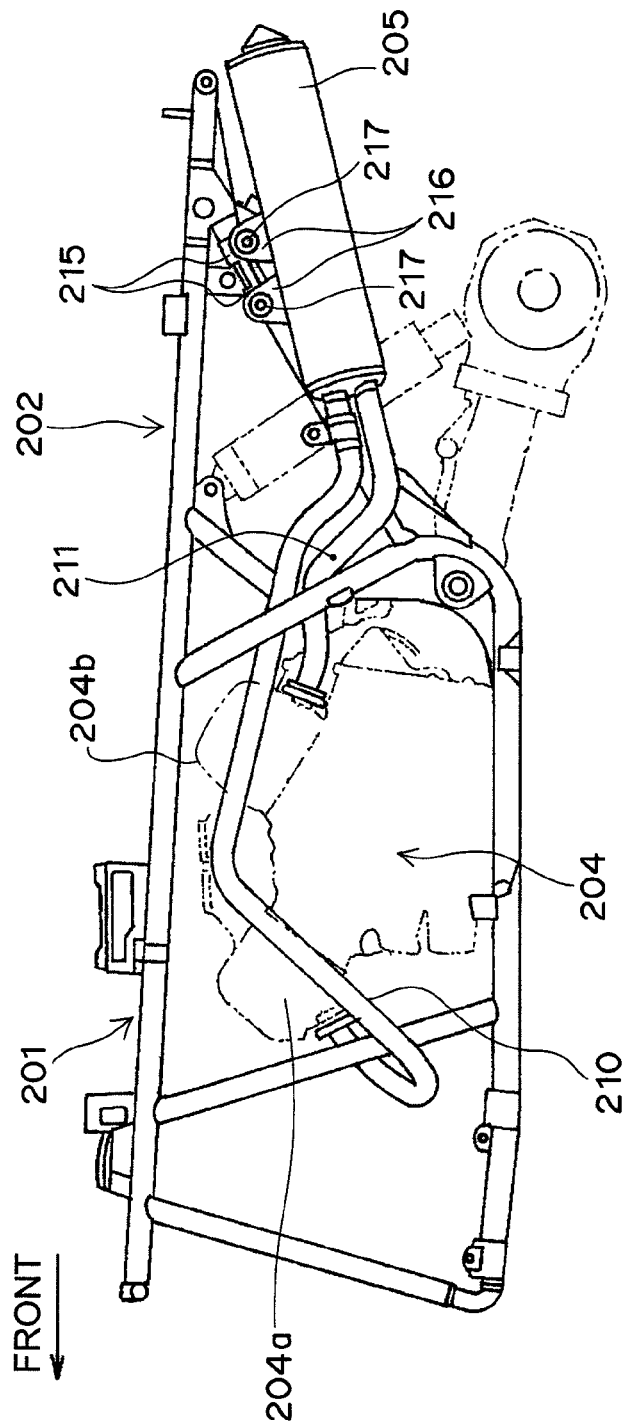
FIG. 9 is a perspective view of a body frame, an engine, and an exhaust system of a conventional straddle-type four-wheeled vehicle.

FIG. 3 is an enlarged perspective view of the muffler 16, FIG. 4 is an enlarged left side view of the muffler 16, FIGS. 5, 6, and 7 are sectional views taken along lines V-V, VI-VI, and VII-VII of FIG. 4, and FIG. 8 is a sectional view taken along line VIII-VIII of FIG. 5. In FIG. 3, the muffler mounting device 32 is provided with a metal rod support plate 35 fixed to an outer peripheral surface of the muffler 16 by welding, a metal rod 36 fixed to an upper end of the rod support plate 35 by welding, a metal front boss 37 supporting a front end of the rod 36, a metal rear boss 38 supporting a rear end of the rod 36, a metal front bracket 41 fixed to the front boss 37 by welding, a metal rear bracket 42 fixed to the rear boss 38 by welding, a front bolt (one example of a fixing member) 43, and a rear bolt (one example of the fixing member) 44.

Meanwhile, in the upper pipe 30 on the left side of the rear frame portion 22, a front muffler mounting portion 45 protruding leftward and a rear muffler mounting portion 46 protruding leftward are arranged so as to be spaced from each other in the front and rear direction. Both the muffler mounting portions 45, 46 are fixed to the upper pipe 30 by welding.

In FIG. 5, the front muffler mounting portion 45 is bent into a box shape with the right and lower sides opened. An upper surface of an upper wall of the front muffler mounting portion 45 serves as a muffler mounting surface 45a which is substantially horizontal or slightly tilted so that the left side is a little lower relative to a horizontal plane. A nut (a female screw portion) 56 is fixed to a lower surface of the upper wall by the welding. A mounting hole 45c corresponding to a screw hole of the nut 56 is formed in the upper wall of the front muffler mounting portion 45. A left surface of a left wall of the front muffler mounting portion 45 serves as a substantially vertical stopper surface 45b extending in the front and rear direction and the up and down direction.

In FIG. 7, the rear muffler mounting portion 46 has a similar structure to the front muffler mounting portion 45. An upper surface of an upper wall serves as a muffler mounting surface 46a which is substantially horizontal or slightly tilted so that the left side is a lowered relative to the horizontal plane. A nut 57 is fixed to a lower surface of the upper wall by welding. A mounting hole 46c corresponding to a screw hole of the nut 57 is formed in the upper wall of the rear muffler mounting portion 46. A left surface of a left wall of the rear muffler mounting portion 46 serves as a substantially vertical stopper surface 46b extending in the front and rear direction and the up and down direction.

In FIG. 6, the rod support plate 35 of the muffler mounting device 32 is formed into a V shape so as to protrude upward when seen from the front side, and arranged on the muffler 16 so that a top part (an upper end) thereof is positioned on the right side (the inner side in the lateral direction) of a center O1 of the muffler 16.

Further, as shown in FIG. 4, the rod support plate 35 is fixed at a biased position on the front side of a center part of the muffler 16 in the front and rear direction. A region R where the rod support plate 35 is fixed is a region where an outer tube of the muffler 16 has a double wall (shown by a broken line). Thereby, exhaust heat in the muffler 16 is not easily transmitted to the rod support plate 35.

In FIG. 8, the rod 36 is fixed to the upper end of the rod support plate 35 so as to extend in the front and rear direction. A front collar portion 36a having a diameter larger than a diameter of the rod is formed in a front part of the rod 36 at a position a fixed distance rearward away from the front end so as to be integrated with the rod 36. A rear collar portion 36b having a diameter larger than the diameter of the rod is formed in a rear part of the rod 36 at a position a fixed distance forward away from the rear end so as to be integrated with the rod 36.

A front inward flange 37a is integrally formed in a front end of the front boss 37, and an entire surface of a rear end of the front boss 37 is opened. Meanwhile, a rear inward flange 38a is integrally formed in a rear end of the rear boss 38, and an entire surface of a front end of the rear boss 38 is opened.

A tubular front rubber damper 53 is inserted into the front boss 37 from the rear side, and the front end of the rod 36 is press-fitted into an inner peripheral hole of the front rubber damper 53. The front end of the rod 36 protrudes forward from a center hole of the inward flange 37a of the front boss 37. Thereby, the front rubber damper 53 is compressed and positioned between the front inward flange 37a of the front boss 37 and the front collar portion 36a of the rod 36. In such a way, the front end of the rod 36, the front boss 37, and the front rubber damper 53 form a front damper mechanism.

A tubular rear rubber damper 54 is press-fitted into the rear boss 38 from the front side, and the rear end of the rod 36 is press-fitted into an inner peripheral hole of the rear rubber damper 54. The rear end of the rod 36 protrudes rearward from a center hole of the inward flange 38a of the rear boss 38. Thereby, the rear rubber damper 54 is compressed between the rear inward flange 38a of the rear boss 38 and the rear collar portion 36b of the rod 36. In such a way, the rear end of the rod 36, the rear boss 38, and the rear rubber damper 54 form a rear damper mechanism.

In FIG. 5, the front mounted bracket 41 is constituted by an upper member 47 which is substantially horizontal or slightly tilted so that the left side is a lowered relative to the horizontal plane, and a lower member 48 bent into a L shape when seen from the front side. The upper member 47 has integral ribs protruding upward in both the front and rear ends. The lower member 48 integrally has an upper wall part 48a fixed to a lower surface of the upper member 47 by welding, a vertical wall part 48b extending downward from a left end of the upper wall part 48a, and stem parts 48c protruding leftward from both the front and rear ends of the vertical wall part 48b. The front boss 37 is fixed to a left end of the upper member 47 and left ends of the stem parts 48c by welding.

In FIG. 7, the rear mounted bracket 42 is constituted by a plate-shape upper member 49 which is substantially horizontal or slightly tilted so that the left side is a little lowered relative to the horizontal plane, and a lower member 50 bent into a L shape when seen from the front side. The upper member 49 integrally has ribs protruding upward in both the rear and front ends. The lower member 50 integrally has an upper wall part 50a fixed to a lower surface of the upper member 49 by the welding, a vertical wall part 50b extending downward from a left end of the upper wall part 50a, and stem parts 50c protruding leftward from both the front and rear ends of the vertical wall part 50b. The rear boss 38 is fixed to a left end of the upper member 49 and left ends of the stem parts 50c by welding.

3. Mounting Task of Muffler (1) In FIG. 8, firstly, the front rubber damper 53 and the rear rubber damper 54 are respectively press-fitted into the front boss 37 and the rear boss 38 before mounting the rod 36 of the exhaust muffler 16.

(2) Next, in FIG. 5, the front boss 37 into which the front rubber damper 53 is press-fitted and the front mounted bracket 41 integrated with the front boss 37 are fixed to the front muffler mounting portion 45 by the front bolt 43. That is, the upper member 47 and the upper wall part 48a of the lower member 48 of the front mounted bracket 41 are disposed on the muffler mounting surface 45a of the front muffler mounting portion 45 from the upper side, the front bolt 43 is brought through a bolt insertion hole 41a of the front mounted bracket 41 from the upper side, and the bolt 43 is screwed into the nut 56 through the mounting hole 45c. Thus, the front mounted bracket 41 is fixed to the front muffler mounting portion 45.

(3) Next, as shown in FIG. 8, the front end of the rod 36 is fitted into the front rubber damper 53 press-fitted into the front boss 37, and the rear end of the rod 36 is fitted into the rear rubber damper 54 press-fitted into the rear boss 38.

(4) Finally, as shown in FIG. 7, the rear boss 38 into which the rear rubber damper 54 is press-fitted and the rear mounted bracket 42 integrated with the rear boss 38 are fixed to the rear muffler mounting portion 46 by the rear bolt 44. That is, the upper member 49 and the upper wall part 50a of the lower member 50 of the rear mounted bracket 42 are disposed on the muffler mounting surface 46a of the rear muffler mounting portion 46 from the upper side, and the rear bolt 44 is brought through a bolt insertion hole 42a of the rear mounted bracket 42 from the upper side and screwed into the nut 57. Thus, the rear mounted bracket 42 is fixed to the rear muffler mounting portion 46.

4. Effect of the Embodiment (1) As shown in FIGS. 5 and 7, the muffler 16 is mounted by disposing the front mounted bracket 41 and the rear mounted bracket 42 of the muffler 16 on the front muffler mounting portion 45 and the rear muffler mounting portion 46 of the body frame F from the upper side, and inserting the front bolt 43 and the rear bolt 44 from the upper side. Thus, both a task of disposing the mounted brackets 41, 42 at predetermined positions of the muffler mounting portions 45, 46, and a task of fastening by the bolts 44, 45 can be easily performed from the upper side. Moreover, even when vibration in the front and rear direction is applied to the muffler 16 during travel, force is not imposed onto the mounted brackets 41, 42 in the direction in which the bolts 43, 44 are loosened around axes of the bolts 43, 44. Thus, loosening of the bolts 43, 44 can be prevented.

(2) As shown in FIGS. 5 and 7, the muffler mounting portions 45, 46 have the stopper surfaces 45b, 46b abutted with the vertical wall parts 48b, 50b of the mounted brackets 41, 42. Thus, even when large vibration is applied to the muffler 16, the loosening of the bolts 43, 44 can be surely prevented.

(3) As shown in FIG. 8, the mounted brackets 41, 42 are coupled to the muffler 16 through the damper mechanisms formed by the bosses 37, 38, the rubber dampers 53, 54, and the rod 36 extending in the front and rear direction. Thus, even when the vibration in the front and rear direction is applied to the muffler 16, the vibration can be absorbed by the damper mechanisms, so that transmission of the vibration to the mounted brackets 41, 42 can be prevented. The rod 36 is press-fitted into the rubber dampers 53, 54 in the front and rear direction. Thus, even when the force is imposed onto the muffler 16 in the front and rear direction, the force does not act as force for shearing the rubber dampers 53, 54 but durability of the dampers is maintained.

(4) As shown in FIG. 8, both the front and rear ends of one rod 36 are respectively supported on the front mounted bracket 41 and the rear mounted bracket 42 through the front damper mechanism and the rear damper mechanism. Thus, the muffler 16 is supported at two points on the front and rear sides, so that strength of supporting the muffler 16 is improved, and at the same time, the number of parts can be reduced.

(5) A position of the front rubber damper 53 in the front and rear direction is regulated by the front inward flange 37a of the front boss 37 and the front collar portion 36a of the rod 36, and a position of the rear rubber damper 54 in the front and rear direction is regulated by the rear inward flange 38a of the rear boss 38 and the rear collar portion 36b of the rod 36. Thus, the positions of the rubber dampers 53, 54 in the front and rear direction can be regulated with a simple structure, so that the stability and strength of mounting the muffler 16 is improved.

5. Other Embodiments (1) In the above embodiment, the front mounted bracket 41 is constituted by two members including the upper member 47 and the lower member 48, and the rear mounted bracket 42 is constituted by two members including the upper member 49 and the lower member 50. However, in the present invention, the mounted brackets 41, 42 can be respectively formed by one member.

(2) In the above embodiment, the front boss 37 integrally has a tubular body part and the front inward flange 37a. However, the front boss 37 can be constituted by two members including the tubular body part and the inward flange. Thereby, for example only by changing a fixing position of the inward flange from the front end to the rear end, the rear boss can be manufactured. That is, the front boss and the rear boss can be respectively manufactured by two members (the tubular body part and the inward flange).

(3) In the above embodiment, one rod 36 is utilized for the front damper mechanism and the rear damper mechanism. However, a front rod can be provided for the front damper mechanism, and a rear rod can be provided for the rear damper mechanism.

(4) Instead of the bolts, other fixing members such as rivets can be used as the fixing members of the mounted brackets.

(5) Instead of the nuts, screw holes can be directly formed in the upper walls of the muffler mounting portions 45, 46 as the mounting holes 45c, 46c provided in the muffler mounting portions 45, 46.

(6) The present invention is not limited to a straddle-type four-wheeled vehicle, but can be also applied to a straddle-type three-wheeled vehicle, and an automatic two-wheeled vehicle.

(7) The present invention is not limited to the structure of the above embodiment, but includes variously modified examples within the scope of the claims.

What is claimed is:

1. A muffler mounting structure of a vehicle, comprising:
a muffler;
at least one muffler mounting portion fixed to a body frame of the vehicle, the muffler mounting portion having a mounting hole, and the muffler mounting portion being horizontal or slightly tilted so that an outside of the muffler mounting portion in a vehicle width direction is lower relative to an inside of the muffler mounting portion,
the mounting hole having an axis passing through the muffler mounting portion in an up and down direction;
at least one mounted bracket provided on an upper part of the muffler and disposed from above onto an upper surface of the muffler mounting portion, the mounted bracket having a fixing member insertion hole, and the mounted bracket having an upper wall horizontal or slightly tilted so that an outside of the mounted bracket in the vehicle width direction is lower relative to an inside of the mounted bracket,
the fixing member insertion hole having an axis passing through the upper wall in the up and down direction; and
at least one fixing member inserted into the fixing member insertion hole of the mounted bracket from an upper side toward a lower side of the mounted bracket, the fixing member being fixed to the mounting hole so as to fix the mounted bracket to the muffler mounting portion.

2. The muffler mounting structure according to claim 1, wherein the muffler mounting portion has a stopper surface abutted with part of the mounted bracket for preventing the mounted bracket from rotating around an axis of the fixing member.

3. The muffler mounting structure according to claim 1, wherein the mounted bracket is fixed to the muffler through a damper mechanism, and
the damper mechanism includes:
a tubular boss formed in the mounted bracket;
a tubular damper fitted into the tubular boss; and
a rod fixed to the muffler and press-fitted into the tubular damper in a front and rear direction.

4. The muffler mounting structure according to claim 1, further comprising a rod fixed to the muffler and extending in a front and rear direction, wherein:
the at least one muffler mounting portion comprises a front muffler mounting portion and a rear muffler mounting portion, the front and rear muffler mounting portions are arranged so as to be spaced from each other in the front and rear direction;
the at least one mounted bracket comprises a front mounted bracket and a rear mounted bracket, the front and rear mounted brackets are arranged so as to be spaced from each other in the front and rear direction;
the front mounted bracket is fixed to the muffler through a front damper mechanism that includes a front tubular boss formed in the front mounted bracket, a front tubular damper fitted into the front tubular boss, and a front end of the rod which is press-fitted into the front tubular damper; and
the rear mounted bracket is fixed to the muffler through a rear damper mechanism that includes a rear tubular boss formed in the rear mounted bracket, a rear tubular damper fitted into the rear tubular boss, and a rear end of the rod which is press-fitted in the rear tubular damper.

5. The muffler mounting structure as according to claim 4, wherein:
- a front end of the front tubular boss has a front inward flange locking the front tubular damper from a front side;
- a rear end of the rear tubular boss has a rear inward flange locking the rear tubular damper from a rear side; and
- the rod has a front collar portion locking a rear end of the front tubular damper from a rear side, and a rear collar portion locking a front end of the rear tubular damper from a front side.

6. The muffler mounting structure according to claim 1, wherein the mounting hole is a female screw hole, and the fixing member is a bolt.

7. A straddle-type four-wheeled vehicle provided with the muffler mounting structure according to claim 1.

8. A straddle-type four-wheeled vehicle provided with the muffler mounting structure according to claim 2.

9. A straddle-type four-wheeled vehicle provided with the muffler mounting structure according to claim 3.

10. A straddle-type four-wheeled vehicle provided with the muffler mounting structure according to claim 4.

11. A straddle-type four-wheeled vehicle provided with the muffler mounting structure according to claim 5.

12. A straddle-type four-wheeled vehicle provided with the muffler mounting structure according to claim 6.

13. A muffler mounting structure of a vehicle, comprising:
- a muffler;
- a front muffler mounting portion provided in a body frame, the front muffler mounting portion having a mounting hole;
- a rear muffler mounting portion provided in the body frame, the rear muffler mounting portion having a mounting hole, wherein the front and rear muffler mounting portions are arranged so as to be spaced from each other in a front and rear direction;
- a front mounted bracket provided on an upper portion of the muffler and disposed on an upper surface of the front muffler mounting portion, the front mounted bracket having a fixing member insertion hole, and an axis of the fixing member insertion hole of the front mounted bracket extends in an up and down direction;
- a rear mounted bracket provided on the upper portion of the muffler and disposed on an upper surface of the rear muffler mounting portion, the rear mounted bracket having a fixing member insertion hole, and an axis of the fixing member insertion hole of the rear mounted bracket extends in an up and down direction, wherein the front and rear mounted brackets are arranged so as to be spaced from each other in the front and rear direction;
- a first fixing member inserted into the fixing member insertion hole of the front mounted bracket from an upper side thereof, the first fixing member being fixed to the mounting hole of the front muffler mounting portion so as to fix the front mounted bracket to the front muffler mounting portion;
- a second fixing member inserted into the fixing member insertion hole of the rear mounted bracket from an upper side thereof, the second fixing member being fixed to the mounting hole of the rear muffler mounting portion so as to fix the rear mounted bracket to the rear muffler mounting portion, wherein the front mounted bracket is fixed to the muffler through a front damper mechanism that includes a front tubular boss formed in the front mounted bracket, and a front tubular damper fitted into the front tubular boss, and the rear mounted bracket is fixed to the muffler through a rear damper mechanism that includes a rear tubular boss formed in the rear mounted bracket, and a rear tubular damper fitted into the rear tubular boss; and a rod fixed to the muffler and press-fitted into the front and rear damper mechanisms so that the rod protrudes from the front and rear damper mechanisms from front and rear sides, respectively, wherein a front end of the rod is press-fitted into the front damper mechanism, and a rear end of the rod is press-fitted into the rear damper mechanism, wherein a front end of the front tubular boss has a front inward flange locking the front tubular damper from a front side thereof, wherein a rear end of the rear tubular boss has a rear inward flange locking the rear tubular damper from a rear side thereof, and wherein the rod has a front collar portion locking a rear end of the front damper mechanism from a rear side thereof, and a rear collar portion locking a front end of the rear damper mechanism from a front side thereof.

* * * * *